United States Patent

[11] 3,608,018

| [72] | Inventor | William E. Henderson |
| --- | --- | --- |
| | | Hinsdale, Ill. |
| [21] | Appl. No. | 722,383 |
| [22] | Filed | Apr. 18, 1968 |
| [45] | Patented | Sept. 21, 1971 |
| [73] | Assignee | Union Carbide Corporation |

[54] COLLAPSING INFLATED TUBING
16 Claims, 3 Drawing Figs.

[52] U.S. Cl..................................................... 264/89,
99/176, 264/95, 264/202, 18/14
[51] Int. Cl..................................................... B29d 7/20
[50] Field of Search........................................... 264/89, 93,
210, 95, 99, 202, 209; 99/175, 176; 18/14

[56] References Cited
UNITED STATES PATENTS

| 2,220,221 | 11/1940 | Dalton............................ | 264/210 X |
| 3,046,178 | 7/1962 | Tupper............................ | 264/93 X |
| 3,239,402 | 3/1966 | Ecklund et al.................. | 264/93 X |
| 3,346,402 | 10/1967 | Lieberman...................... | 264/209 X |
| 3,408,918 | 11/1968 | Talty et al....................... | 264/209 X |
| 3,413,130 | 11/1968 | Rose............................... | 264/209 X |
| 3,423,493 | 1/1969 | Klenk et al..................... | 264/93 |

*Primary Examiner*—Robert F. White
*Assistant Examiner*—T. J. Carvis
*Attorneys*—Paul A. Rose and John F. Hohmann ABSTRACT: An apparatus and method are provided for collapsing an extruded inflated tubular material so that damage to the tubular material upon collapse is minimized and substantially reduced.

PATENTED SEP 21 1971    3,608,018

INVENTOR
WILLIAM E. HENDERSON
BY Salvatore C. Mitri
ATTORNEY

COLLAPSING INFLATED TUBING

This invention relates to a method and apparatus for collapsing extruded, inflated tubing in order to facilitate further processing of that tubing. More particularly, this invention relates to a method and apparatus for collapsing extruded, inflated tubing utilized in the production of food casings.

The tubings to which this invention relates are those generally obtained by the extrusion of such materials as collagen, alginates, starches and the like, which tubings are usually employed as food casings serving as containers molds, and wrappings for food products encased and processed therein.

In the manufacture of tubing from these materials, many problems have been encountered in handling these materials, especially after they have been extruded into tubings. For example, in the extrusion of tacky, delicate and fragile tubular casings, such as those obtained from collagen compositions, the extruded inflated tubing is conveyed to and through a primary dryer unit wherein it is dried sufficiently to impart to it a degree of cohesive strength which will enable it to withstand further processing. The predried tubing is then collapsed into a flattened, two-ply strand of casing so that it can be subsequently conveyed through a series of liquid treatment baths without damaging the casing. Flattening of the casing serves to prevent roping of the tubular casing and/or entrapment of air therein as it is conveyed through the liquid treatment baths.

Heretofore, these extruded, inflated tubular casings have been collapsed by means of a pair of counterrotating nip rolls which are usually positioned at the outlet end of the predryer unit. These nip rolls typically comprise a driven bottom roll and a counterbalanced idler roll positioned above and opposite the driven bottom roll. The idler roll is generally counterbalanced with movable weights so that it can be adjusted to provide optimum tubing collapsing pressure while compensating for variations in the air pressures utilized to inflate the casings as well as compensate for different casing sizes as the casings are conveyed between the idler roll and the driven bottom roll.

Proper adjustment of the pressure exerted by the idler roll during operation has been difficult, at best. If the idler roll is adjusted to bear down on the casing with too much pressure, the casing can be excessively deformed and/or damaged. Conversely, if the idler roll is adjusted to exert too little pressure, the air utilized to inflate the casing will escape thereby causing the flattened tubing to become reinflated as it is advanced to the liquid treatment baths. When this occurs, the reinflated tubing tends to rope and cannot be controlled as it is advanced through the liquid treatment baths. Additionally, any friction in the bearings of or inertia in the balancing of this system further aggravates these conditions.

The use of nip rolls also acts to excessively flatten the inflated tubular casing along its edges thereby creating sharp creases in the casing which result in longitudinal lines of low strength in the finished casing. Even the most careful adjustment of the nip rolls results in imparting excessive stress on the rounded edges of the casing during flattening. Furthermore, if the tubular casing has excessive wrinkles or creases formed in its edges as it is being collapsed and flattened, there is an even greater tendency for this portion of the casing to bear the entire force of the idler roll thereby causing even more serious damage to the casing at these points.

In order to overcome these difficulties, several approaches have been attempted including covering the idler roll with resilient types of material in order to attain a more even distribution of the pressures exerted by this roll. Hence, materials such as foam rubber, wool and nylon as well as combinations of these materials have been used to cover the idler roll in attempts to provide a uniformly resilient backing beneath a nonsticking cover or coating. Typically, the bottom driven roll is fabricated from a hard metal which has also been coated with a material to prevent the casing from sticking to it. Hence, it has been found necessary to coat or cover both nip rolls with a material which would render them nonsticking. Nonetheless, even with the most careful maintenance and adjustment of the idler roll, damage to the tubular casings still occurred.

It is an object of this invention, therefore, to provide a method and apparatus for collapsing extruded, inflated tubular materials without damaging these tubular materials before they are subjected to further processing.

This and other objects of the invention will become more apparent from the ensuing description thereof.

The objects of this invention can be generally attained by utilizing a fluid ejection means to collapse extruded, inflated tubular materials. The fluid ejection means is positioned so that a flow of fluid, such as air, is impinged upon the inflated tubing as it approaches and is transported over a support surface. Preferably, the flow of fluid is directed so that it is perpendicular to the longitudinal axis of the tubing and is of sufficient force to collapse, flatten and substantially deflate the tubing onto the support surface as the tubing contacts the support surface.

The invention will become more clear when considered together with the accompanying drawing wherein.

Figure 1:
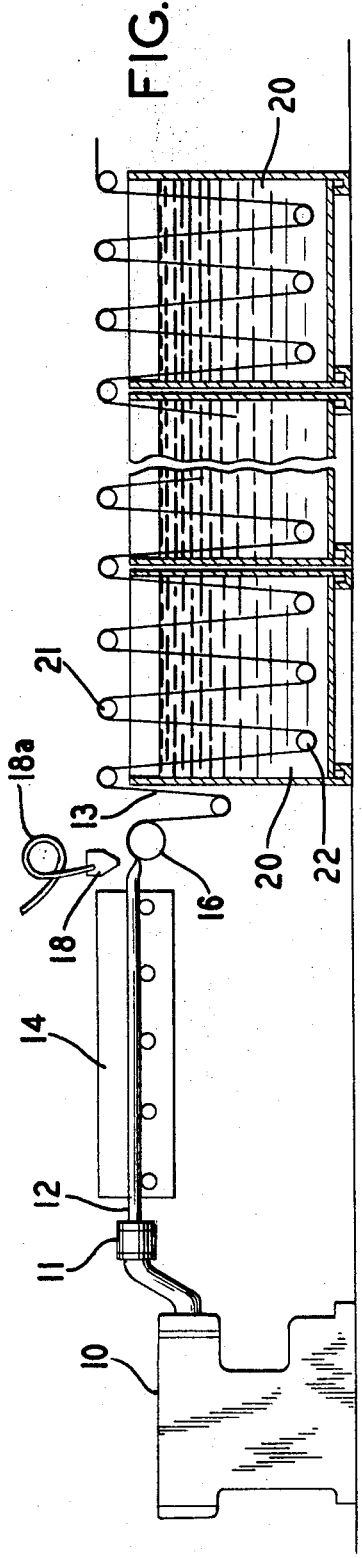
FIG. 1 is a schematic, side elevational view depicting a system typically utilized to extrude and fabricate tubular materials.

Turning now to the drawing there is shown in FIG. 1 an extruder 10 which is utilized to extrude a material from an annular die 11 in the form of a tube 12 after which the tube is generally inflated by means well known to those skilled in the art. As has been discussed hereinabove, when a tubing, such as those obtained from collagen compositions, is extruded, it is inflated and then preferably predried in order to impart to it a degree of cohesive strength so that it can be readily subjected to subsequent processing. To accomplish this, a predryer unit 14 can be placed in line with the extruder 10 so that the extruded, inflated tubular collagen can be conveyed therethrough and dried. The inflated tubing 12 is then guided and trained over the upper surface of a support surface such as a driven roll 16 above which there is positioned a fluid ejection means, such as an air nozzle 18 having a conduit 18a connected to a suitable air supply source, (not shown). The flow of air from the air nozzle 18 directed upon the inflated tubular material 12 causes the inflated tubing 12 to be deflated and collapse onto the surface of driven roll 16 prior to its being advanced therefrom and guided to and through a series of liquid treating tanks, 20. Liquid treating tanks, 20 are typically equipped with a plurality of driven rolls 21 and idler rolls 22 about which the collapsed and flattened tubing 13 is trained as it is conveyed through the liquid treating tanks 20. Upon leaving the liquid treating tanks 20, the collapsed tubing 13 is advanced for further processing.

Figure 2:
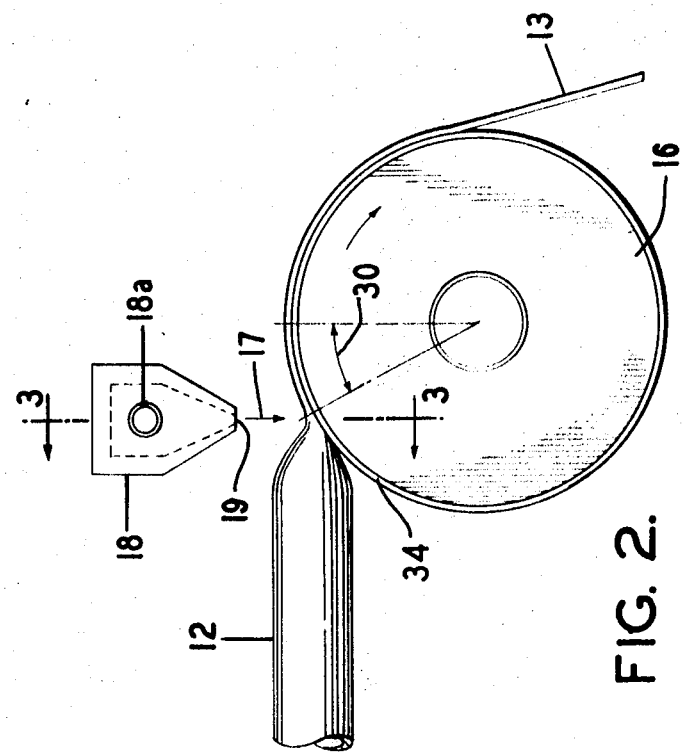
FIG. 2 is an exaggerated side elevational view illustrating the configuration of a tubing collapsed and flattened by the method and apparatus of the invention.

As shown in FIG. 2, reference numeral 17 denotes a jet of relatively high velocity air directed from the orifice 19 of the air nozzle 18 onto the tubular material 12. The orifice 19 should preferably be fabricated so that it is at least about as wide as the tubular material to be flattened. In FIG. 2, reference numeral 30 identifies the angle of approach of the inflated tubing 12 being advanced to the driven roll 16.

As employed herein and in the appended claims, the term "angle of approach" should be understood as and is intended to refer to the angle formed by two radii of the driven roll 16 which radii include at least a portion of the arc subscribed by the flattened tubing 13 in contact with the surface of driven roll 16 (FIG. 2). Preferably, the angle of approach 30 should be from about 15° to 45°. One of the radii defining the angle of approach 30 will be determined by the point at which the inflated tubing 12 first contacts the surface of driven roll 16 while the other will be determined by that point on the surface of the driven roll 16 through which a plane tangent thereto would be parallel to the longitudinal axis of the inflated tubing 12 as it is advanced toward driven roll 16.

In a preferred embodiment, the surface of driven roll 16 is covered with a wettable or wicking material 34 (FIG. 2), such as an absorbent paper, which can be wetted by a nonsticking agent so that the flattened tubing 13 can be readily withdrawn from driven roll 16.

Turning now to FIG. 4 there is shown therein a bottom driven roll 40 and a counterbalanced idler roll 42 which comprise the counterrotating nip rolls of the type presently utilized to flatten and collapse extruded tubular materials. Reference numeral 44 denotes a resilient material on the surface of idler roll 42 while reference numeral 46 denotes a nonsticking material on the surface of bottom driven roll 40 and on the resilient material 44 coating the surface of idler roll 42. In FIG. 4, reference numeral 48 denotes a tubular material flattened and collapsed by idler roll 42 and bottom driven roll 40.

As is known to those skilled in the art, the extrusion of collagen composition into tubular form results in a tubular collagen which is delicate, fragile and sticky. In order to prevent extruded collagen tubing from collapsing on itself and having its walls stick to each other, it is maintained in a tubular configuration by inflating it with air as it is extruded so that it can be conveyed for further processing. Due to the low cohesive strength characteristics of extruded collagen tubing, the air pressure utilized to initially inflate it is quite low, normally on the order of from about 0.2–1.0 inches water. If inflation pressures greater than about 1 inch water are utilized, the freshly extruded collagen tubing has a tendency to burst or be unduly stretched, while an inflation pressure lower than about 0.2 inches water is not sufficient to maintain the freshly extruded collagen tubing in a tubular configuration.

A typical operation of the apparatus of the invention will now be described with particular reference to extruded tubing obtained from collagen compositions and will be more fully comprehended when considered together with the accompanying drawing.

As has been pointed out hereinabove, after extruded collagen tubing has been inflated, it is desirable to convey it through a predryer unit 14 where it can be typically subjected to a stream of warm air maintained at a temperature of from about 40° C. to 90° C. for a period of from about 1 to 3 minutes. During this predrying, an amount of water is removed from the collagen tubing sufficient to provide that degree of cohesive strength to it which will enable it to be subsequently processed without being damaged.

The thusly predried, inflated tubular collagen 12 is then advanced toward driven roll 16 so that its angle of approach 30 (FIG. 2) is from about 15° to 45°. As the inflated tubular collagen 12 contacts the surface of driven roll 16 (FIGS. 1–3), a stream or jet of relatively high velocity air 17 is directed downwardly through orifice 19 of air nozzle 18 onto the upper surface of the inflated tubular collagen 12. The velocity of the jet of air 17 directed onto the upper surface of inflated tubular collagen 12 need not be excessive. Since extruded, tubular collagen is inflated with an air pressure of only from about 0.2–1.0 inches water, a jet of air 17 having a velocity capable only of collapsing and substantially deflating the inflated tubular collagen 12 as it contacts and is guided over driven roll 16 will be sufficient. Furthermore, when inflated tubular collagen 12 is advanced toward driven roll 16 at the proper angle of approach 30 (FIG. 2), it has been found that the inflated tubular collagen 12 can be collapsed by the jet of air 17 to the flattened, two-ply configuration 13 (FIG. 3), with a minimum of distortion to its walls.

When other inflated tubular materials, such as regenerated cellulose and the like, are to be collapsed according to the method an apparatus of this invention, the amount of pressure to be exerted thereon by the fluid impinged upon them and the surface area of the tubing to be contacted will be dependent upon the air pressures utilized to inflate these tubings as well as the nature and characteristics of the tubular materials. The amount of fluid pressure to be employed therefor, will vary with different tubular materials but can be readily determined, controlled and regulated by those skilled in the art.

In practicing this invention, it has also be found to be preferable to maintain the surface of the driven roll 16 in a wet condition, such as by wetting the wicking material 34 with a neutralizing solution. This assists in preventing freshly extruded tubular collagen from sticking to the circumferential surface of the driven roll 16. A neutralizing solution which will not cause reswelling of the collagen, such as dilute aqueous ammonia having a pH about 9.5 to 11.5, can be effectively utilized for this purpose. Actually, any suitable dilute base solution can be employed to wet the wicking surface 34 of driven roll 16. By maintaining the wicking surface 34 of the driven roll 16 in a wet condition, possible stretching exerted by peeling forces when flattened tubular collagen 13 tends to stick to the surface of the driven roll 16 are avoided. Additionally, any tendency of the flattened tubular collagen 13 is stick to and become overwrapped about the driven roll 16 is prevented. The neutralizing solution can be applied to the wicking surface 34 of driven roll 16 by means well known to those skilled in the art such as by spraying, passing a portion of the driven roll 16 through a trough containing the neutralizing agent and the like.

Figure 3:
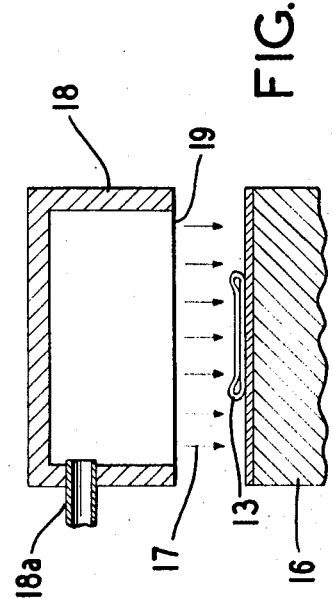
FIG. 3 is a view taken through line 3—3 of the apparatus shown in FIG. 2 illustrating the configuration of a tubing collapsed and flattened in accordance with the apparatus of FIG. 2; and, FIG. 4 is a view similar to that of FIG. 3 illustrating a portion of typical apparatus presently in use.

Upon being collapsed, the flattened tubular collagen 13 will assume the configuration illustrated in FIG. 3. The collapsed tubular collagen 13 can then be conveyed to and through liquid treating thanks 20 and then advanced therefrom for further processing:.

In addition to avoiding all the attendant problems accompanying the use of a driven lower roll and a counterbalanced idler roll as described hereinabove, it has been found that use of the fluid ejection means of this invention eliminates and substantially reduces damaging inflated tubular material since it effectively eliminates excessive localized compression points which normally cause the edges of collapsed and flattened tubings to become weakened. This is exemplified in FIGS. 3 and 4 wherein the configuration of a flattened tubular material 13 collapsed by the method and apparatus of this invention (FIG. 3) can be compared with the configuration of flattened tubular material 48 collapsed by present, commercially employed apparatus (FIG. 4). As can be seen in FIG. 3, the edges of the flattened tubular material 13 remain rounded while those obtained from presently employed apparatus utilizing a driven lower roll and a counterbalanced idler roll (FIG. 4) are flattened and subjected to excessive pressure giving rise to the formation of creases thereby resulting in longitudinal lines of low strength in the finished product.

It has also been found that use of the fluid ejection means of this invention does not require that freshly extruded tubular collagen exhibit as high a degree of cohesive strength as has been heretofore required before it is collapsed and flattened. For example, the minimum extent of predrying extruded tubular collagen prior to its being flattened and collapsed by use of the idler roll and driven roll of the apparatus described hereinabove was found to be that which would result in a collagen solids content of about 16 percent after predrying. On the other hand, use of the fluid ejection means of the present invention permits a substantially reduced predrying of extruded tubular collagen to result in a collagen solids content of only from about 6 to 12 percent. Stated in another way, it is now possible to remove only about half as much water from extended tubular collagens than has been heretofore required before the extruded, inflated tubular collagen is collapsed. Hence, use of the fluid ejection means of the invention in conjunction with a predryer unit results in a substantial increase in production rates. Although the amount of time necessary to predry freshly extruded tubular collagen can be and has been consistently reduced to from about 30 to 50 percent, it has been found that under certain conditions, the freshly extruded tubular collagen need not be predried at all. For example, it has been found that a freshly extruded, inflated tubular collagen having a collagen solids content of about 9 percent can be collapsed and flattened by the fluid ejection means of this invention without being predried at all.

While the present invention has been described with particular reference to collagen tubing, it should be understood that this has been merely by way of illustration and exemplifying the invention and that the invention is not intended to be, in any way, limited thereto. The apparatus and method of this invention are equally applicable to other tubular materials such as those obtained from regenerated cellulose, starches, alginates and the like, as well as other synthetic and naturally occurring materials which are formed into tubing.

Similarly, reference to the use of air as the fluid flattening media has also been set forth solely to illustrate and exemplify the invention and is not intended to be construed as limiting the invention thereto. Other fluids, both gaseous and liquid, can also be employed with equal facility. For example, gases, such as oxygen, nitrogen, and the like, and liquids, such as the neutralizing solution described hereinabove, utilized in the form of jets, sprays, curtains and the like can be employed as the fluid flattening media.

Although the support surface over which the inflated casing is trained has been described as a driven roll. It should be further understood that this has also been for the purpose of illustrating and exemplifying the invention. Other support surfaces such as idler rolls, rotating rolls, arcuate or rounded surfaces, belts and the like can be utilized with equal facility and the surfaces of these means can be primarily provided with a wettable material capable of being wetted with a nonsticking agent.

Hence, although the present invention has been described with particularity and in some detail it should be understood that changes, modifications and alterations can be therein without departing from the scope and spirit of the invention.

What is claimed is:

1. A method for collapsing continuous lengths of tacky, fragile, tubular materials without distortion thereof including the steps of;
    advancing a continuous length of inflated tacky, fragile tubular material to and over a support surface at an angle of approach of from 15° to 45°;
    b. directing a continuous flow of fluid to impinge downwardly onto the surface of the advancing continuous length of inflated tubular material at the point where it is first trained over the support surface such that the continuous length of inflated tubular material is collapsed, flattened and substantially deflated without distortion thereof by the flow of fluid; and
    c. conveying the continuous length of collapsed tacky, fragile tubular material from the support surface without distortion thereof.

2. The method of claim 1 wherein the width of the flow of fluid impinged onto the surface of the inflated tubular material is about at least as wide as the width of the tubular material.

3. The method of claim 2 wherein the flow of fluid is directed at an angle substantially perpendicular to the longitudinal axis of the inflated tubular material as the inflated tubular material contacts the support surface.

4. The method of claim 3 which includes wetting the surface of the support surface with a nonsticking agent.

5. The method of claim 3 wherein the fluid is air.

6. The method of claim 1 wherein the fluid is a neutralizing solution.

7. The method of claim 3 wherein the inflated tubular material is collagen.

8. The method of claim 7 wherein the inflated tubular material is predried before it is advanced toward and over the support surface.

9. The method of claim 8 wherein the predried inflated tubular collagen has a collagen solids content of up to about 16 percent.

10. An apparatus for collapsing continuous lengths of tacky, fragile tubular materials without distortion thereof comprising in combination:
    a. a rotatably mounted support surface
    b. means for advancing a continuous length of inflated tacky, fragile tubular material to and over said support surface at an angle of approach of from 15° to 45°;
    c. fluid ejection means adjacent said support surface for directing a flow of fluid downwardly to impinge onto the inflated tacky, fragile tubular material at the point where it is first trained over said support surface, said fluid ejection means having an orifice defined therein through which the flow of fluid is directed that is at least about as wide as the width of the tubular material, whereby the fluid downwardly impinges onto at least the full width of the advancing inflated tubular material at the point where it is first trained over said support surface such that the advancing inflated tubular material is collapsed and substantially deflated without distortion thereof; and,
    d. means for conveying a continuous length of collapsed tacky, fragile tubular material from said support surface without distortion thereof.

11. The apparatus of claim 10 wherein the fluid is air.

12. The apparatus of claim 10 wherein the support surface is a driven roll.

13. The apparatus of claim 10 wherein the tubular material is a collagen food casing and the fluid is a neutralizing solution.

14. An apparatus for collapsing continuous lengths of inflated tacky, fragile tubular food casing materials without distortion thereof comprising, in combination;
    a. a predryer unit through which a continuous length of inflated tacky, fragile tubular food casing material is conveyed;
    b. a driven roll associated with the outlet end of said predryer unit;
    c. means for advancing a continuous length of inflated tacky, fragile tubular food casing material from said predryer unit to and over said driven roll at an angle of approach of from 15° to 45°;
    d. a fluid ejection means adjacent to said driven roll for directing a flow of fluid to impinge downwardly onto the inflated tubular material when the tubular material is first trained over said driven roll such that the advancing continuous length of inflated tubular material is collapsed, flattened and substantially deflated without distortion thereof by the flow of fluid, said fluid ejection means having an orifice defined therein through which the flow of fluid is directed which orifice is about at least as wide as the width of the tubular material,
    e. means for conveying a continuous length of collapsed, deflated tubular material from said driven roll.

15. The apparatus of claim 14 wherein the surface of the driven roll is covered with a wettable material capable of being wetted with a nonsticking agent.

16. The apparatus of claim 14 wherein the fluid ejection means is disposed so as to direct a flow of fluid downwardly perpendicular to the longitudinal axis of the advancing tubular material.